United States Patent [19]

Suzuki et al.

[11] Patent Number: 5,043,869
[45] Date of Patent: Aug. 27, 1991

[54] STORAGE AREA STRUCTURE IN INFORMATION PROCESSOR

[75] Inventors: Norihisa Suzuki, Yokohama; Tohru Nojiri; Shumpei Kawasaki, both of Tokyo, all of Japan

[73] Assignee: Hitachi, Ltd., Tokyo, Japan

[21] Appl. No.: 503,112

[22] Filed: Mar. 30, 1990

Related U.S. Application Data

[63] Continuation of Ser. No. 922,890, Oct. 24, 1986, abandoned.

[30] Foreign Application Priority Data

Oct. 25, 1985 [JP] Japan ................... 60-237296

[51] Int. Cl.⁵ .............................................. G06F 12/00
[52] U.S. Cl. ................................. 364/200; 364/246.1; 364/252.6; 364/255.7
[58] Field of Search ... 364/200 MS File, 900 MS File

[56] References Cited

U.S. PATENT DOCUMENTS

| | | | |
|---|---|---|---|
| 3,585,605 | 6/1971 | Gardner et al. | 364/200 |
| 4,130,870 | 12/1978 | Schneider | 364/200 |
| 4,145,745 | 3/1979 | DeBijl | 364/200 |
| 4,188,662 | 2/1980 | Ishibashi | 364/200 |
| 4,325,120 | 4/1982 | Colley et al. | 364/200 |
| 4,385,352 | 5/1983 | Bienvenu | 364/200 |
| 4,388,682 | 6/1983 | Eldridge | 364/200 |
| 4,400,769 | 8/1983 | Kaneda et al. | 364/200 |
| 4,511,964 | 4/1985 | Georg et al. | 364/200 |
| 4,638,426 | 1/1987 | Chang et al. | 364/200 |
| 4,792,895 | 12/1988 | Tallman | 364/200 |

OTHER PUBLICATIONS

Ishikawa et al., "The Design of an Object Oriented Architecture", IHL Symposium on Computer Architecture, IEEE, Jun. 1984, pp. 178-187.
Mazor et al., "Promote User Privacy Through Secure Memory Areas", Computer Design, vol. 21, No. 10, Oct. 1982, pp. 89-92.
Hackstein, "Adressgenerierung belm iAPX 432", Nachrichtentechnsche Zeitschrift NTZ, vol. 35, No. 11, Nov. 1982, pp. 702-705.

Primary Examiner—Thomas M. Heckler
Attorney, Agent, or Firm—Antonelli, Terry, Stout & Kraus

[57] ABSTRACT

In an indirect access system where an entry ai ·a of an object table is accessed and then an object area ·s accessed based on the content of the entry area, a data field to store the same information as prescribed information (class) in the object area is added to the entry area. Thereby when information (class) required to determine the subsequent information in the microprocessor is referred to, the object area need not be accessed. Accordingly, the execution speed can be improved.

8 Claims, 2 Drawing Sheets

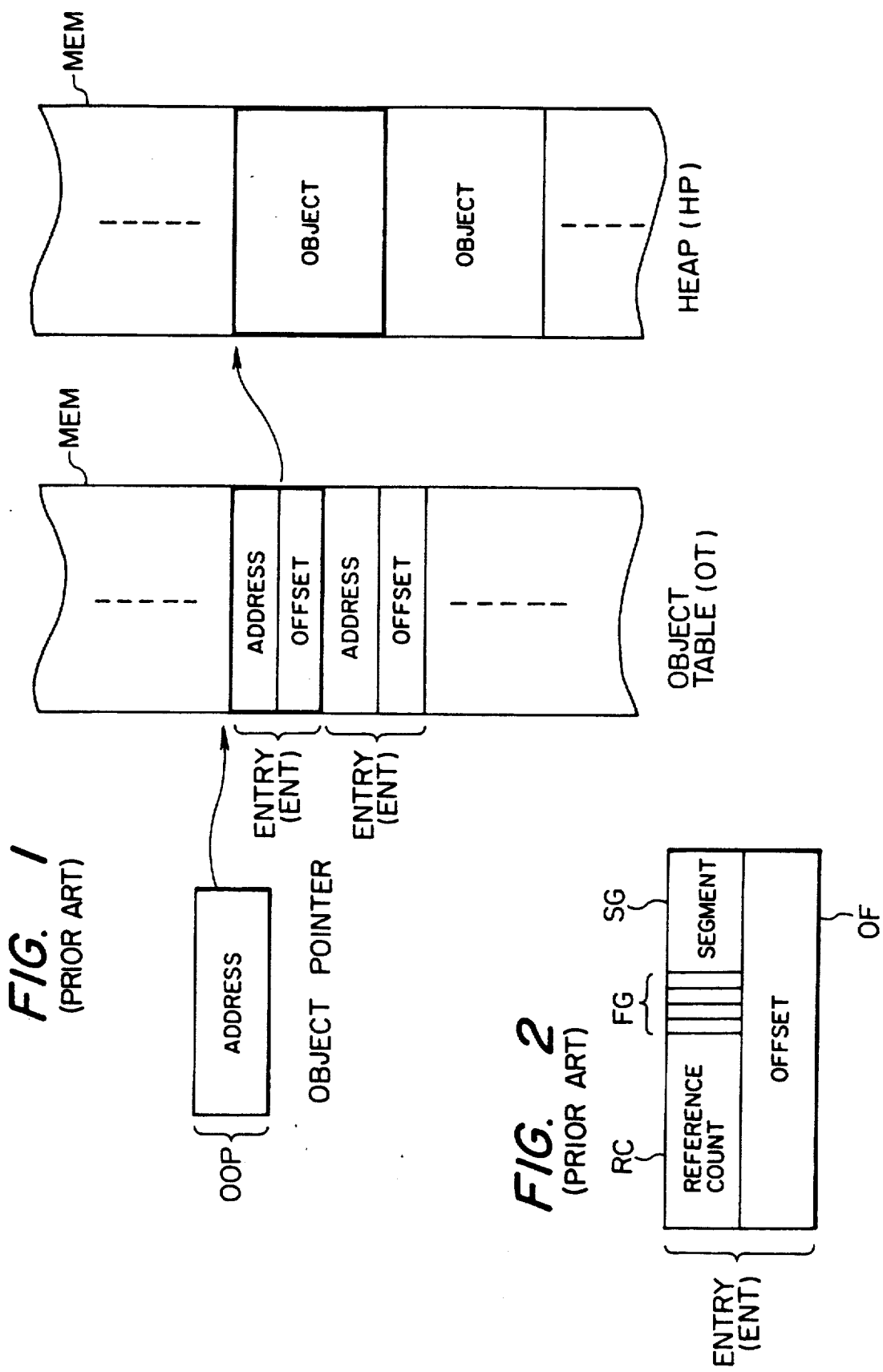

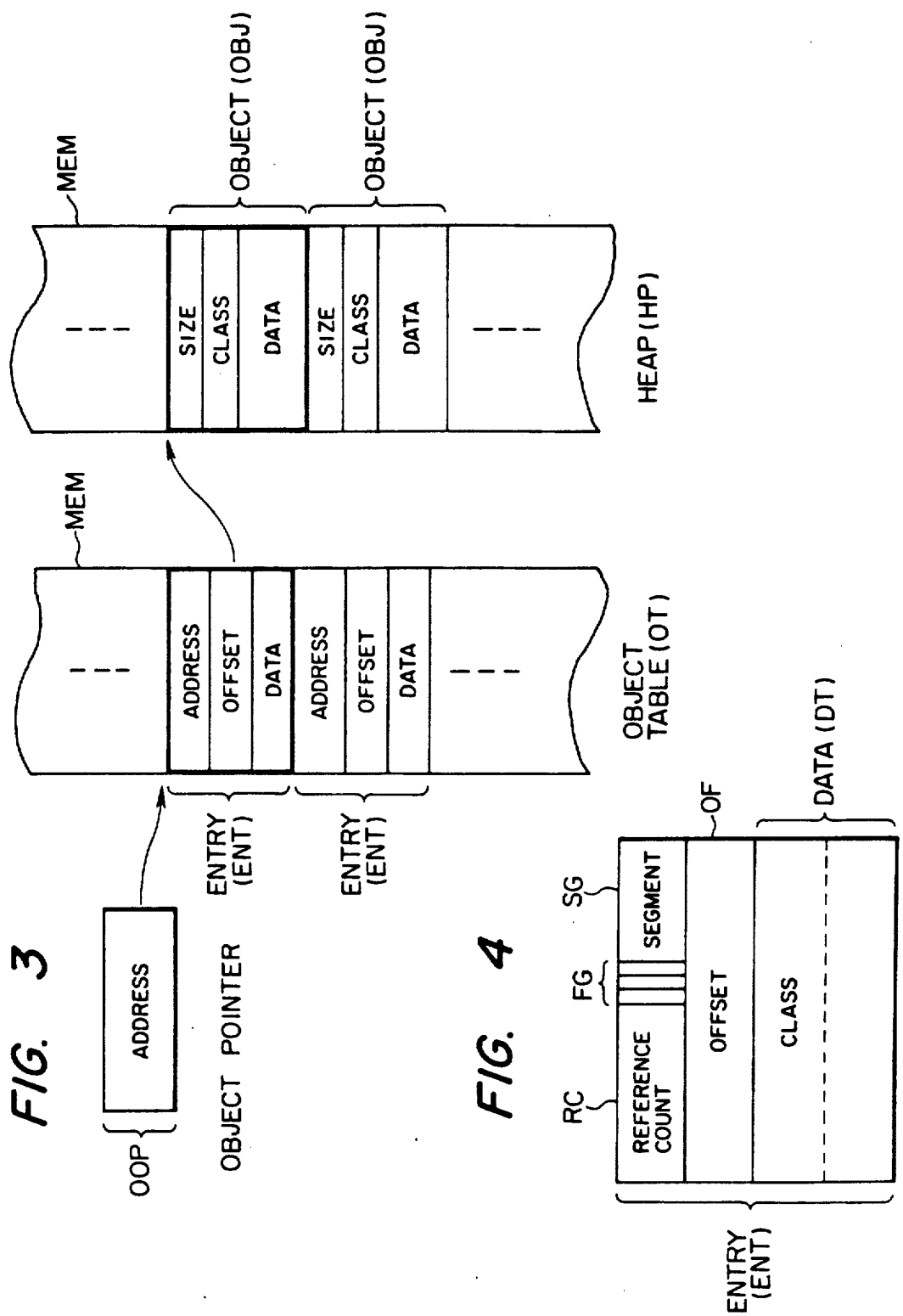

STORAGE AREA STRUCTURE IN INFORMATION PROCESSOR

This application is a continuation of application Ser. No. 922,890, filed on Oct. 24, 1986, now abandoned.

BACKGROUND OF THE INVENTION

The present invention relates to an effective technique to be applied to a microprocessor which executes a program written by object-oriented language, for example, to an effective technique to be utilized in a storage control system in a microprocessor which acts in language called smalltalk.

In programming using the object-oriented language, a program is constituted in a unit of object where data and procedure for the data are made one body. Transmission of message to the object is the basic operation. When the program is executed, reading of the object occurs frequently. Consequently, in the system where the program written by the object-oriented language runs, the storage control of the object and the reading system of the object are important in order to determine the execution speed.

FIG. 1 shows an example of a storage control system of the prior art in a microprocessor acting in program written by smalltalk. In the smalltalk, that which plays the role of a memory in a usual system is called a heap HP. When the heap HP is accessed by an object pointer, a table called an object table OT is first accessed by a logic address called Oop. Thereby a physical address and offset contained in an entry ENT in the object table OT are obtained. As a result, using the physical address and the offset, it can be determined where substance (object) indicated by the Oop exists in the heap HP. The object table OT, the heap HP and the like are a part of the main memory MEM.

In the prior art, structure of each entry area of an object table in a microprocessor for smalltalk as shown in FIG. 2 is composed of a reference count area RC storing the reference number of the object, a segment field SG representing the physical address of the object and an offset field OF (refer to "Iwanami Course, Microelectronics 7, Programming Language and VLSI" pp. 152-158, published by Iwanami Shoten K.K. in June 24, 1985).

In the object-oriented language, subsequent operations during the program execution are not known until a class field of the accessed object (a field indicating a class to which the object belongs) is identified. Consequently, in the indirect access system using the object table in the prior art, in order to determine the (subsequent operations, the object table must be first quoted and the object be accessed by the physical address obtained from the table and the class be referred to. In other words, since the subsequent operation (called "method" in the smalltalk) quotes the table (being a method dictionary) from the class of the object at the receiving side and the selector of the message so as to search the method, the class of the object is necessary. Moreover, it has been performed by a macro program. Consequently, this method is disadvantageous in that the time until the determination of the operation is long and the execution-speed of the program is slow.

SUMMARY OF THE INVENTION

An object of the invention is to provide a memory structure which aims to improve execution speed of a program in a microprocessor executing the program written by object-oriented language.

An outline of an exemplary embodiment of the invention disclosed in the present application can be described as follows.

When a program written by object-oriented language is executed, a data field containing data such as class within an object is added to each entry in the object table, thereby when the object table is quoted and the corresponding data field is referred to, the subsequent operation can be determined and the necessary data can be obtained and therefore the execution speed of the program can be improved.

BRIEF DESCRIPTION OF THE DRAWINGS

FIG. 1 is an explanation diagram illustrating an access system of an object in a microprocessor for smalltalk in the prior art;

FIG. 2 is an explanation diagram illustrating an example of an object table in the prior art to be used in accessing and object;

FIG. 3 is an explanation diagram illustrating an object table use system according to the present invention; and FIG. 4 is an explanation diagram illustrating an example of the object table in the present invention.

DESCRIPTION OF THE PREFERRED EMBODIMENTS

FIG. 3 shows an essential part of an embodiment of the invention applied to a system acting according to a program written by smalltalk.

In this embodiment, a data field DT is provided to each entry ENT within an object table (address converting table) OT indicated by the value of Oop (entry number) within an object pointer and allocated on a main memory MEM. The data field DT stores data regarding an object Obj in a heap HP on the memory MEM indicated by a physical address (absolute address) in the entry ENT, e.g., class to which the indicated object Obj belongs. Each object Obj in the heap HP generally contains the size of the object or various data together with the class to which the object belongs. Consequently, when an object is newly formed on the heap HP and an entry to read the object is provided on the object table OT, the class to be entered in the object may be entered also in the data field of the corresponding entry.

In this constitution, for example, in program written by smalltalk, the class of an object at the receiving side required in calling a method can be easily determined. In the access system in the prior art, using a physical address obtained by quoting the object table OT, the object in the heap HP must be accessed one by one so as to read the class. On the contrary, according to the foregoing system of the embodiment, of the present invention in order to know the class of an object, the one by one search in the heap is not necessary but the object table OT may be simply quoted and the data field DT in the corresponding entry ENT be referred to thereby a desired class can be immediately known.

Although the above embodiment has been described in an example where the class of the corresponding object is entered in the data field DT belonging to each entry ENT in the object table OT, other data which is used frequently among data regarding the object Obj other than the class may be entered in the data field DT of each entry ENT. Since use of the same data in the same object frequently occurs on account of local property of the program, if such data is entered in the object table OT, the object in the heap HP need not be accessed indirectly through the object table OT one by one but the necessary data can be frequently obtained by quoting the object table OT.

If such important data is known during the object forming, it may be previously entered in the data field DT of the corresponding entry ENT. Even if the important data is not previously entered in the data field DT of the entry ENT, when the data is used for the first time, the data read from the object Obj in the heap HP may be written into the data field DT of the entry ENT on the corresponding object table OT. Also in this case, since the data once referred to may be used again with high probability on account of local property of the program, the access time of the same data is reduced at the second time and so on.

In order to enter the class of the corresponding object into the data field DT of the entry ENT on the object table OT, when the class of the object is first referred to, it may be written into the data field.

FIG. 4 shows a more concrete example of the entry of the object table OT being suitable for the object-oriented language such as smalltalk.

The entry of the embodiment comprises a reference count area RC, a flag area FG, a segment field SG and an offset field OF together with a data field DT of two words, for example.

The combination of the segment field SG in four bits and the offset field OF in 16 bits constitutes an absolute address of the object in 20 bits so that the object Obj in the heap HP is accessed. The flag area FG contains a flag necessary for the memory control of the object, e.g., a bit indicating whether or not the content of the object is a pointer.

The reference count area RC is a field to be utilized for collection of the object, where the number of other objects indicating the object is entered. If RC becomes 0, it means that the object is not referred to by others. Consequently, when RC becomes 0, the object being not used is collected according to a program called garbage collector so that an empty storage area can be reused (garbage collection).

When an object is newly formed, in order to find rapidly the empty area with necessary and sufficient size to contain the object, a linear list connecting the empty area of equal size and a table containing the top end address of the linear list of the empty area per size are formed. If the size of the empty area becomes smaller gradually and therefore the search of the empty area to contain the new object fails, processing called compaction is performed to collect separate empty areas into one large empty area.

Above-mentioned processings of control of the object table OT, formation of the object, the garbage collection, formation of the linear list, the compaction and the like have been all executed by macro programs in the prior art. In the present invention, however, the above-mentioned processings regarding the storage control using the object table OT are all executed by micro programs within the microprocessor. Thereby the execution speed of the program can be significantly improved.

According to the above-mentioned embodiments of the present invention, the following effects are obtained.

Since a data field to contain data such as class data within an object is added to an entry indicating at least a frequently accessed object among entries in the object table, only if the object table is quoted and the corresponding data field is referred to, the subsequent operation can be determined and the necessary data can be obtained and therefore the execution speed of the program can be improved. Moreover, since the storage control using the object table is entirely performed by micro program in the present invention, the execution speed of the program is further improved.

The invention made by the inventors has been concretely described by way of embodiments. However, the invention is not restricted to the above-mentioned embodiments, but it may be, of course, modified variously in scope without departing from the spirit of the invention. For example, although the object table is formed on the main memory in the description of the embodiments, it may be allocated on the register group of a chip with a large capacity.

Although the invention made by the inventors has been mainly described in the case of application to a system acting according to a program written by smalltalk being the use field as the background of the invention, the invention is not restricted to this but can be generally utilized in the storage control method in a system executing program written by the object-oriented language.

What is claimed is:

1. A storage area structure connected to an information processor, said storage area structure comprising:
   a first storage area allocated on a main memory for storing object information, said object information being instructions for controlling operation of said information processor;
   a second storage area constituting an address converting table; and
   a third storage area for storing an address indicating a respective object information stored in the first storage area through the address converting table;
   wherein said second storage area includes an additional area for storing class information which is a part of said object information stored in the first storage area; and
   wherein said address stored in said third storage area is used by said information processor to access said first storage area by applying said address to said address converting table of said second storage area which converts said address into an address which is applied to said first storage area and wherein said part class information which is a part of said object information stored in said second storage area is used to determine subsequent operations of said information processor.

2. A storage area structure in an information processor as set forth in claim 1, wherein said additional area stores information required to determine an operation to be executed by the information processor.

3. A storage area structure in an information processor as set forth in claim 2, wherein the information is written into the additional area by execution of a micro program.

4. A storage area structure, connected to an information processor, including a plurality of storage areas, said storage area structure comprising:
   a first storage area assigned to a main memory, for storing object information including class information indicating a class of said object, said object information being instructions used for controlling the operation of said information processor and said class information being used to determine subsequent operations of said information processor;

a second storage area for storing entry information related to a respective object information of said first storage area, said second storage area being arranged to form an address converting table for converting a pointing address to an address of said first storage area;

a third storage area for storing said pointing address which points to an address of a particular object information in said first storage area through said address conversion table;

wherein said third storage area is used by said information processor to access said first storage area through said second storage area; and wherein said entry information includes an address and said class information for a respective object information such that only said first storage area pointed to by said third storage area through said second storage area need to be accessed by said information processor to determine a subsequent operation of said information processor.

5. A memory area structure connected to a data processor including a plurality of memory areas, said memory area structure comprising:

a first memory area for storing instruction information which is used to control the operation of said data processor;

a second memory area for storing first address information being used to access said first memory area and for storing a portion of said instruction information; and a third memory area for storing second address information being used to access said second memory area, wherein said third memory area is used by said data processor to access said first memory area through said second memory area and wherein said portion of said instruction stored in said second memory area is used to determine a subsequent operation of said data processor.

6. A memory area structure according to claim 5, wherein said instruction information includes data and procedure information for controlling said data processor.

7. A memory area structure connected to a data processor including a plurality of memory areas, said memory area structure comprising:

a first memory area for storing instruction information which is used to control the operation of said data processor;

a second memory area for storing first address information being used to access said first memory area and for storing a portion of said instruction information; and a third memory area for storing second address information being used to access said second memory area, wherein said third memory area is used by said data processor to access said first memory area through said second memory area and said portion of said instruction stored in said second memory area is used to determine a subsequent operation of said data processor;

wherein said instruction information includes data and procedure information for controlling said data processor; and wherein said portion of said instruction information stored in said second memory area includes said procedure information.

8. A memory area structure according to claim 7, wherein said instruction information is object information which is a unit of a program; and wherein said portion of said instruction information is class information which identifies a class to which said object information belongs, said class information being used to determine a subsequent operation of said data processor.

* * * * *